United States Patent [19]

Daussan et al.

[11] 4,440,575
[45] Apr. 3, 1984

[54] GRANULAR INSULATION PRODUCT AND PROCESS FOR ITS PREPARATION

[76] Inventors: Jean-Charles Daussan, 42 rue Saint-Marcel; Gérard Daussan, 9 avenue Leclerc de Hauteclocque, both of 57000 Metz; André Daussan, 52 rue des Pepinieres, 57050 Longeville les Metz, all of France

[21] Appl. No.: 435,309

[22] Filed: Oct. 19, 1982

Related U.S. Application Data

[63] Continuation-in-part of Ser. No. 156,392, Jun. 4, 1980, abandoned.

[30] Foreign Application Priority Data

Jun. 11, 1979 [MC] Monaco ................................. 1386

[51] Int. Cl.$^3$ ..................................... B28B 7/34
[52] U.S. Cl. ..................... 106/38.22; 75/96; 164/123; 249/202; 252/62
[58] Field of Search ............. 106/38.22; 252/62; 75/96; 164/123; 249/202

[56] References Cited

U.S. PATENT DOCUMENTS

| | | | |
|---|---|---|---|
| 1,454,410 | 8/1923 | Robison . | |
| 2,958,998 | 5/1976 | Atterbury | 106/38.22 |
| 3,262,165 | 7/1966 | Ingham | 106/38.22 |
| 3,326,273 | 6/1967 | Jago | 164/369 |
| 3,377,146 | 4/1968 | von Stroh | 44/10 |
| 3,516,821 | 6/1970 | Neu | 75/96 |
| 3,630,267 | 12/1971 | Hlinka | 164/82 |
| 3,685,986 | 8/1972 | Rutes | 75/96 |
| 3,704,230 | 11/1972 | Loricchio | 252/182 |
| 3,769,046 | 10/1973 | Sprinkle et al. | 106/38.22 |
| 3,811,865 | 5/1974 | Ladell | 75/3 |
| 3,829,297 | 8/1974 | Crawford | 44/15 D |
| 3,876,420 | 4/1975 | Phoenix et al. | 75/27 |
| 3,923,526 | 12/1975 | Takashima | 106/38.22 |
| 3,953,219 | 4/1976 | Takashima | 106/38.27 |
| 3,958,998 | 5/1976 | Atterbury | 106/38.22 |
| 4,003,717 | 1/1977 | Cass | 44/10 R |
| 4,004,918 | 1/1977 | Fukuoka et al. | 75/11 |
| 4,012,262 | 3/1977 | Patterson et al. | 106/38.22 |
| 4,038,069 | 7/1977 | Takashima | 75/96 |

FOREIGN PATENT DOCUMENTS

| | | |
|---|---|---|
| 254023 | 5/1967 | Austria . |
| 1286953 | 1/1969 | Fed. Rep. of Germany . |
| 1270253 | 4/1972 | United Kingdom . |
| 1342885 | 1/1974 | United Kingdom . |
| 1420190 | 1/1976 | United Kingdom . |
| 1466250 | 3/1977 | United Kingdom . |
| 1480584 | 7/1977 | United Kingdom . |
| 2003456 | 3/1979 | United Kingdom . |
| 1547423 | 6/1979 | United Kingdom . |

OTHER PUBLICATIONS

Probst, Han Buch der Betonsteinindust-Rie p. 30 (1962).

*Primary Examiner*—Lorenzo B. Hayes
*Attorney, Agent, or Firm*—Young & Thompson

[57] ABSTRACT

The granular insulation product is intended more particularly for the insulation, protection or processing of metal baths during their manufacture or transport. The product comprises a solid phase having a certain mineral matter content and an organic binder comprising cellulose-based pulp, and preferably paper pulp. The granulation is carried out under conditions such that the granules being formed experience no appreciable compression likely to break the structure of the solid phase containing the mineral matter.

6 Claims, No Drawings

GRANULAR INSULATION PRODUCT AND PROCESS FOR ITS PREPARATION

This is a continuation-in part of application Ser. No. 156,392 filed June 4, 1980, now abandoned.

The present invention relates to an insulation product in granular form, comprising at least one solid phase with a certain mineral matter content, and at least one organic phase intended more particularly as a binder for the first phase, although the granules in question may contain other constituents, and to a process of preparing the granular product concerned.

The product of the present invention is intended more particularly for insulating, protecting and processing metal baths during their transport or manufacture, for example by covering the free surface of a bath of steel contained in a ladle, or by covering the free surface of a bath of steel flowing in a continuous casting tundish The advantage of such granular products for foundry or steelworks use is, more particularly, that they allow easy handling by pneumatic means, by avoiding bagging.

There are numerous products for insulating metal baths, and they are used in powder form. For example, it is known to use vermiculite or perlite or quite simply soot from coal-burning power stations, the soot being used either as it is or, if required, granulated.

The main disadvantage of these various products ia a relatively low melting point (1100° C. to 1300° C.); the proportions in which the product are used are, therefore, considerable, because they tend to be converted to liquid slag on contact with the metal. The amount of slag forming as a result is also an obstacle.

It has also been proposed to use the ash from burning rice husks in the presence of air. This powdered product, which is of a very high silicon content and a density of the order of 0.3, consists of very friable particles, the largest of which may be more than 1 mm and the smallest down to 1 micron. It has been found that the thermally insulating capacity improves with the absence of small particles in the rice husk ash.

Generally, rice husk ash contains about 20% of particles below 0.05 mm in size, and this percentage of very small particles increases with the harshness of the mechanical handling experienced by the ash. Rice husk ash has refractory properties which are very much higher than ordinary silica. This is due to the fact that the silica particles of this ash are laden with residual carbon which gives them their refractory power.

Although the thermal characteristics of this ash are excellent (low thermal conductivity, melting point above 1600° C.), its use entails certain disadvantages, the main two of which are dust nuisance and poor spreading properties due to the rod-like structure of this ash.

Although granulation of the rice husk ash would theoretically obviate the above disadvantages, this itself has a considerable drawback because compression with a binder to form the granules breaks the very fragile siliceous skeleton of the ash particles and greatly reduces the insulating properties of the granules.

The present invention is based on the discovery that granules of the kind referred to can be produced under very advantageous conditions with a specific organic binder used either on its own or in conjuction with other agents having a binder action, the resulting granules in turn having very advantageous properties for use.

According to the present invention, there is provided a granular insulation product intended more particularly for the insulation, protection or processing of metal baths during their manufacture or transport, comprising a solid phase having a certain mineral matter content, in the form of a by-product of a vegetable substance containing silica, and an organic binder comprising cellulose-based pulp.

It has been discovered that cellulose-based pulp, more particularly paper pulp, has specific advantages as regards both manufacture and utilization, giving granules of very varying composition, intended mainly for foundries and steelworks.

The proportion of paper pulp in the final product is advantageously in the range of from 0.1 to 20% dry matter, preferably from 2 to 8%.

The grain size of the granules is in turn generally in the range from approximately 0.1 to 20 mm, preferably from 0.5 to 5 mm.

The solid phase in the divided state, which has a certain mineral matter content, which is agglomerated into granules by the paper pulp, may be selected more particularly from the following classes of products in the particular or powdered state:

(a) Purely mineral materials such as perlite, vermiculite, fossil silica or chamotte, (b) Organic materials in the form of fragments or particles of by-products of vegetable waste having, more particularly, a certain silica content. More particularly, the vegetable matter referred to according to the invention is preferably the waste of the graminaceous plants, including wheat and maize, and also rice husks or hulls, (c) the ash of the foregoing vegetable products, and more particularly rice husk ash, (d) Coke or coal soot.

According to one specific embodiment, the granules contain an additional binder such as a starchy binder, sugar, synthetic resin, clay, sodium silicate or colloidal silica or mixtures thereof, or a stearate.

The granules may also be coated with a layer of particles of carbon or graphite or soot from thermal power stations or blast-furnace slag in a powdered state, with or without the addition of conventional fluxes.

According to the second aspect of the present invention there is provided a process for the production of a granular product in accordance with the first aspect of the present invention, wherein granulation is carried out under conditions such that the granules forming experience no appreciable compression likely to break the structure of the solid phase containing the mineral matter.

To this end, the process uses, for example, one of the following techniques, namely rolling the forming granules on one another inside a rotary tank or a fixed tank with a rotary balde, or sprinkling paper pulp on granules in a fluidized bed.

The following composition formulae of granular products in accordance with the invention are given by way of example.

Granules particularly advantageous for the foundry and steel making industries are formed from waste, in a gragmented or pulverulent state, of one or more graminaceous plants, such as wheat or maize, or rice husks, or ash thereof, the granules being agglomerated with paper pulp. The proportions by weight based on dry matter are advantageously as follows:

Phase of vegetable origin, for example rice husk ash: from 60 to 99.9%

Dried paper pulp: from 0.1 to 40% the most advantageous range being as follows however:

Phase of vegetable origin: from 92 to 98%

Dried paper pulp: from 2 to 8%

The graminaceous plants of which the waste is used in this invention contain silica in varying contents, preference being given to those having the highest content, for example rice husks. The product will be used in the non-calcinated state when the granules are to be as light as possible. For example, rice husk has a density of 0.15 while its ash has a density of 0.30 approximately. Also, the non-calcinated product has a higher carbon content than the ash, thus increasing the exothermic power of the granules.

To increase the strength of the pellets produced by granulation, a binder may be added, for example a starchy binder, sugar, a synthetic resin, a clay or a sodium silicate.

A binder mixture may also be used, for example a clay associated with a water-soluble starchy binder. The advantage of this combination is that the clay remains inside the pellet while the liquid binder will migrate to the surface on drying.

Granulation procedure:

Granulation is normally carried out to give a group of spherical pellets of a diameter in the range of from 0.1 to 20 mm, preferably from 0.5 mm to 5 mm, the paper pulp being in aqueous suspension.

In order that the low density of the basic powder may be maintained, it is not possible to use a granulation process with excessive pressures, for example above 1 bar. The invention, therefore, proposes the use of a process in which granules are produced by rolling the grains of powdered material on one another. More particularly, rotating tanks may be used similar to cement-mixtures, or fixed tanks inside which a specially shaped blade enables the grains to be suspended and moved without crushing them. Apparatus may also be used for spraying paper pulp in aqueous suspension on to the mineral phase in the form of a fluidized bed.

The following Examples illustrate the invention.

EXAMPLE 1

Granulation was carried out in a cylindrical vertical-axis tank of a diameter of 60 cm, volume 100 liters (useful volume 50 liters), in which a vertical-axis blade rotated at a spedd of 40 to 300 rpm.

The powder, in this case rice husk ash, was wetted with paper pulp containing 2 to 5% dry extract. The granulation operation took some 10 minutes.

The binder may be added by spraying a liquid as soon as the granules start to form. The granules are then dried to give a product containing less than 2% moisture.

EXAMPLE 2

The granulation was carried out in the tank of example 1. Rice husk ash and paper pulp in the dry state were introduced into said tank in the dry state and the blade was rotated at a speed of 40 to 300 rpm for enabling the rice husk ash and paper pulp particles to roll on one other. Water was progressively introduced in said tank until obtaining a final concentration of paper pulp in said water comprised as in example 1 between 2 and 5% by weight. The blade was rotated continuously until spherical granules of a diameter in the range of from 0.5 mm to 5 mm were obtained. The granules were then dried to less than 2% moisture content.

Experience has shown that the method according to example 2 gives better results than that of example 1.

The advantages from using paper pulp are more particularly as follows:

The addition of paper pulp during granulation enables the granule to form much more quickly, all other things being equal. The result is spherical granules formed by an intimate mixture of paper fibres and the product for agglomeration. This is a particular advantage in the case of rice husks or the ash thereof, which granulates very badly. With paper pulp, a very small quantity of binder can be used, which gives the granules their mechanical strength after drying.

More particularly, rice husk ash simply wetted, in a granulating machine, forms spherical pellets which are destroyed as soon as the machine stops turning. A great advantage of the addition of paper pulp is that this bulk protects the basic grain from impacts and gives the resulting spherical pellet a porous structure resulting in a granule in which there is practically no increase in the apparent density of the product.

Another advantage of paper pulp is that it can neutralize any harmful influence of the binder on the ash grain. For example, it has been found that an ash simply granulated with clay gives a granule with a melting point below that of the initial ash and the spherical pellets of which do not disintegrate, irrespective of the temperature used. Spherical pellets granulated by means of paper are still very refractory and also revert to the powder form after an increase in temperature has resulted in the paper being burnt. This fact partly contributes to increasing the insulating power of the granules to the extent that the product reverts to the slightly powdered form when the heat has destroyed the paper by carbonization.

It has also been found that the granules of the product according to the invention have different properties depending upon the proportion of paper pulp, and the carbon content of the rice husk ash.

For example, if the granules contain 2 to 3% paper pulp and the rice husk ash has a relatively low residual carbon content (4 to 8% residual carbon), the silica particles of the rice husk ash sinter together at the temperature of molten steel. An actual integral cover having a porous structure is thus produced on the surface of the molten liquid and provides good thermal insulation.

This process is promoted by the presence of molten metal slag which acts as a flux towards the rice husk ash. This sintering also takes place at a very high temperature (above 1400° C.), which is applicable to continuous casting tundishes.

When the rice husk ash has a high residual carbon content (above 12%) with a small quantity of paper pulp binder, sintering does not occur. After decomposition of the paper pulp the granules become pulverulent. The thermal insulating power remains excellent, however. Sintering of the silica particles of the ash does not take place because of the high carbon content, which makes them refractory.

When the rice husk ash has a low residual carbon content (between 5 and 8%), sintering of the silica particles of the ash takes place if the proportion of paper pulp is less than 15%. To avoid sintering, therefore, the paper pulp must be used in proportion above this value.

The above results are also found if the rice husk is replaced by vermiculite, perlite or fossil silica, to which soot has been added, depending upon whether the latter has a low or high carbon content.

We claim:

1. A method for the production of a granular heat insulating product to be spread on the free surface of a bath of molten metal contained in a metallurgical vessel, comprising the following steps:

introducing in a substantially vertical-axis cylindrical tank containing a vertical-axis blade, rice husk ash wetted with an aqueous suspension of paper pulp containing between 2 and 5% of paper pulp for enabling the wetted rice husk ash grains to roll on one another, rotating the blade at a speed of 40 to 300 rpm until spherical granules of a diameter in the range of from 0.5 mm to 5 mm are obtained, and drying the granules to less than 2% moisture content.

2. A granular heat insulating product to be spread on the free surface of a bath of molten metal contained in a metallurgical vessel, produced by the method of claim 1 and consisting essentially of from 60 to 99.9% by weight of rice husk ash and from 0.1 to 40% by weight of dried paper pulp.

3. A granular heat insulating product according to claim 2, wherein said granules comprise from 92 to 98% by weight of rice husk ash and from 2 to 8% by weight of dried paper pulp.

4. A method for the production of a granular heat insulating product to be spread on the free surface of a bath of molten metal contained in a metallurgical vessel, comprising the following steps:

introducing in a substantially vertical-axis cylindrical tank containing a vertical-axis blade, dry rice husk ash, and dry paper pulp, rotating the blade at a speed of 40 to 300 rpm. for enabling the rice husk ash and paper pulp particles to roll on one another, inroducing water progressively in said tank until the final concentration of paper pulp in said water is between 2 and 5%, rotating the blade at a speed of 40 to 300 rpm. until spherical granules of a diameter in the range of from 0.5 mm to 5 mm are obtained, and drying the granules to less than 2% moisture content.

5. A granular heat insulating product to be spread on the free surface of a bath of molten metal contained in a metallurgical vessel, produced by the method of claim 4 and consisting essentially of from 60 to 99.9% by weight of rice husk ash and from 0.1 to 40% by weight of dried paper pulp.

6. A granular heat insulating product according to claim 5, wherein said granules comprise from 92 to 98% by weight of rice husk ash and from 2 to 8% by weight of dried paper pulp.

* * * * *